United States Patent [19]

van der Voort

[11] Patent Number: 4,562,777
[45] Date of Patent: Jan. 7, 1986

[54] HEAT GENERATOR

[76] Inventor: Eduard T. J. van der Voort, Meloenstraat 158, The Hague, Netherlands

[21] Appl. No.: 605,691

[22] Filed: Apr. 30, 1984

[30] Foreign Application Priority Data

May 6, 1983 [NL] Netherlands .......................... 8301598

[51] Int. Cl.⁴ ................................. F23B 7/00
[52] U.S. Cl. .................................... 110/234; 110/102;
110/118; 110/123; 110/254; 110/293; 110/302;
110/315; 122/15
[58] Field of Search ............... 110/102, 103, 116, 118,
110/123, 207, 208, 209, 229, 230, 231, 234, 242,
248, 254, 256, 293, 302, 313, 322, 323, 326, 312,
315; 122/15

[56] References Cited

U.S. PATENT DOCUMENTS

| 1,800,105 | 4/1931 | Rainchon | 110/293 |
|---|---|---|---|
| 2,469,639 | 5/1949 | Franklin | 110/293 |
| 2,879,727 | 3/1959 | Walters | 110/293 |
| 4,007,696 | 2/1977 | Robertson | 110/293 |
| 4,102,279 | 7/1978 | Groschl et al. | 110/234 |
| 4,213,404 | 7/1980 | Spaulding | 110/229 |
| 4,278,034 | 7/1981 | Reale | 110/234 |
| 4,285,282 | 8/1981 | Good | 110/256 |
| 4,311,102 | 1/1982 | Kolze et al. | 110/102 |
| 4,395,956 | 8/1983 | Hand, Jr. et al. | 110/248 |
| 4,461,243 | 7/1984 | Carpaneto | 110/234 |

Primary Examiner—Albert J. Makay
Assistant Examiner—Steven E. Warner
Attorney, Agent, or Firm—Martin Smolowitz

[57] ABSTRACT

A heat generator comprising a fuel supply chamber (7a), having at its lower end an inwardly tapered section (12), comprising at its lower end a burner plate (14) with mixing strips (33) and a combustion pipe (20), said tapered section (12) being provided with apertures (8) for primary air in its upper part, apertures (13) for secondary air at a level just above the level of the burner plate (14) and apertures (22) for tertiary air at a level just below the level of the burner plate (14) at the level of mixing strips (33). Preferably all air supplies are preheated. The combustion pipe (20) stands in closed connection with an outlet-pipe, preferably provided with an adjustable ventilator.

12 Claims, 8 Drawing Figures

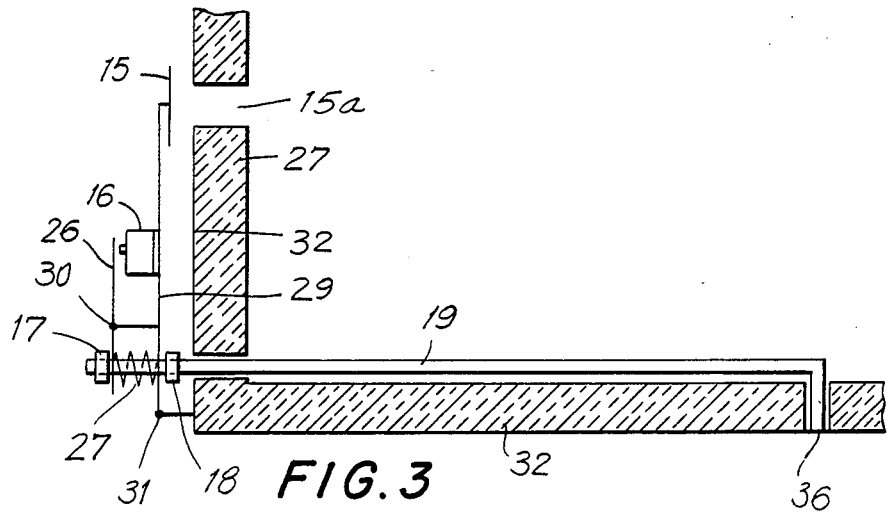
FIG. 3
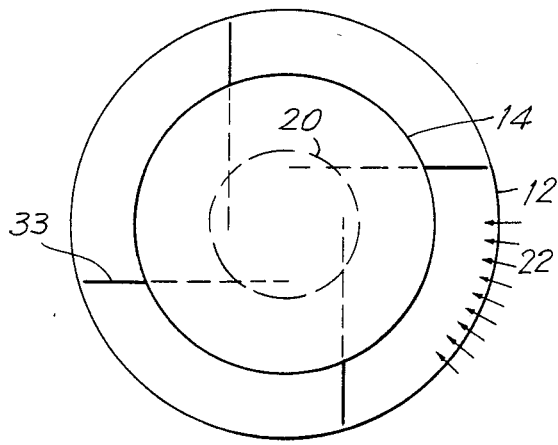
FIG. 4
FIG. 5

HEAT GENERATOR

TECHNICAL FIELD

This invention relates to a heat generator. More particularly, it relates to a wood gas generator in working cooperation with a burner, suitable for use in combination with a heat exchanger. This invention especially relates to a wood gas generator in working cooperation with a burner, wherein the burner comprises a burner plate with mixing strips and a combustion pipe.

BACKGROUND OF THE INVENTION

Wood gas generators as such have been known for many decades and their use has been aimed at the utilization of the wood gas thus generated in combustion motors.

On the other hand, wood has been used and is still used in open or closed wood fires. The circumstances under which this has been achieved are such that inconvenient tar formation will occur, requiring frequent sweeping of the chimneys, such fireplaces being unsuitable for unproblematic burning of used wood or wood cuttings, in particular when such wood has been painted or has been plasticized. The heat yield of wood according to that procedure is also relatively small. These open or closed wood fires are using a grate to support the fuel, i.e. the wood logs.

It is an object of the present invention to provide a simple, efficient heat generator with a high yield, especially suitable for the use of wood as a fuel, in particular small pieces of wood, hereinafter referred to as "piece-goods", which, if desired, may also be painted or plasticized, while avoiding the disadvantages of wood for heating purposes as encountered with hitherto known installations.

SUMMARY OF THE INVENTION

In accordance with the present invention a heat generator is provided by a wood gas generator in combination with a burner, incorporated in the fire-bed of the wood gas generator. This combination may in turn be combined with a firebox and subsequent heat exchanger, as will be described in more detail hereinafter.

By suitable adjustment of the air-supply, it is possible to achieve complete combustion of the gas generated in the wood gas generator by means of the heat generator according to the invention, in the burner, and if desired in the fire box. The heat thus released can be used substantially completely for heating purposes by means of a heat-exchanger.

The heat generator according to the invention comprises an upper fuel supply section constituting a fuel supply chamber, provided with a feed port with a lid, and at the lower end an inwardly tapered section, comprising in its lower end a burner plate with mixing strips and a combustion pipe with a collar, in which a continuous gas flow can be maintained from the tapered section towards a gas discharge pipe, connected therewith.

More specifically the tapered section is provided with a supply line for primary air in its upper part, a supply for secondary air at a level just above the level of the burner plate, and a supply for tertiary air at a level just below the level of the burner plate.

The upper fuel supply section may consist of any material that is not self-combustible at temperatures below 500° C., and as such normal steel may be used.

The inwardly tapered section is exposed to somewhat higher temperatures up to 800° C., and may consist of materials capable of being exposed to such temperatures, such as special stainless steel of fire steel.

The burner plate, provided with eccentrically positioned mixing strips at its side facing away from the inwardly tapered section, is exposed to substantially higher temperatures in a range of 1000° C. to 1200° C. and consequently will consist preferably of a suitable refractory material, such as for example fire steel, ceramics or aluminum hydroxide.

The capacity of the heat generator is dictated by the primary air supply. This primary air supply may be provided by apertures in the upper part of the inwardly tapered section. Alternatively the primary air may be provided by one or more air-lances which release air at that level. The primary air provides gasification.

The secondary air supply may be provided by apertures in the wall of the inwardly tapered section at a level just above the level of the burner plate. The secondary air has to maintain the ignition temperature of the gas in the combustion pipe at low load. Preferably the secondary air is preheated in order to minimize any possible cooling effect of the secondary air on the gas stream, with which it is going to be mixed. This preheating may be achieved in a suitable manner by contacting a wall of the secondary air supply with the gas flow emanating from the gasification stage.

The tertiary air supply may be provided by apertures in the wall of the inwardly tapered section at a level just below the level of the burner plate. The tertiary air thus provides the oxygen for combustion of the combustible gas generated in the preceeding stages.

A part of the ashes is carried along through the combustion pipe with the outflowing gas. This ash will sinter or melt respectively at the temperature of about 1000 to 1200° C., thus leaving substantially no minute ash particles in the flue gases. Thus the need for expensive devices for trapping ash from the flue gases is avoided.

A pressure drop in the inwardly tapered section is maintained from its upper wider part towards its narrower lower part by either feeding pressurized air, or alternatively by a ventilator positioned downstream of the inwardly tapered section. By suitable adjustment of the gas flow, and in particular the air supply at the various levels, it will be possible to comply with the desired capacity. The air supplies are used both for gasification and for complete combustion of the gases formed in the wood gas generator. An additional advantage is that in the heat generator according to the invention any possible other materials present in the fuel supply, which arrive together with the gas flow in the combustion pipe, will be completely combusted, or nearly completely be combusted, as a consequence of the prevailing temperature in the combustion pipe.

BRIEF DESCRIPTION OF DRAWINGS

The invention will be elucidated in more detail with reference to the accompanying drawings, without limiting the invention to the embodiments of the invention as presented therein.

With reference to the accompanying drawings.

FIG. 3 shows a combined air supply adjustor;

FIG. 4 shows a top view of a burner plate according to the invention;

FIG. 5 shows a vertical cross-section of the burner plate and its immediate vicinity;

DESCRIPTION OF INVENTION

Figure 1:
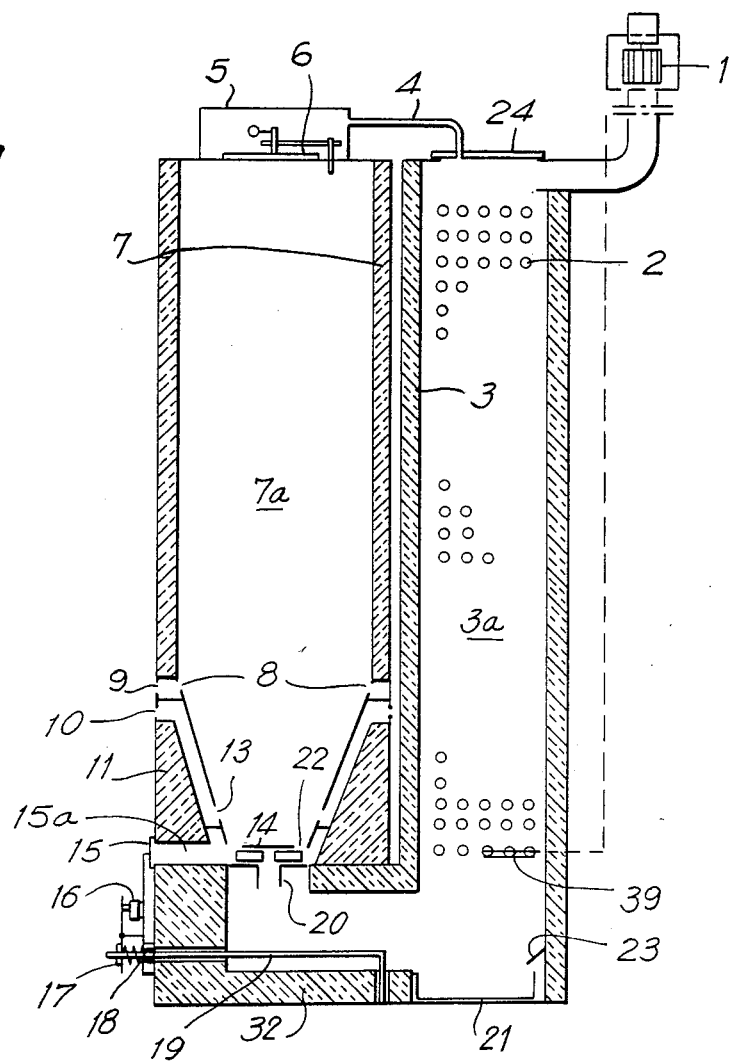
FIG. 1 shows a longitudinal section of a heating system in accordance with the invention comprising a heat generator according to the invention.

With reference to FIG. 1, a longitudinal cross-section is shown of the heat generator and the heating system according to the invention, wherein a flue connection with an adjustable ventilator (1), coupled to a thermostat (39) and a switch (16) for minimum level, is provided after boiler pipes (2), arranged in a boiler (3a) with insulation (3). The boiler (3a) is provided with a cleaning hatch (24), and provided with a connection (4) for suction from a suction lid (5) of a generator vessel (7a). The generator vessel (7a) is provided with an insulating wall (7), a cover (6), inlet apertures (8) for supply of primary air, as well as a control valve (9) for the primary air. In addition a control valve (10) for supply of secondary air to secondary air inlet apertures (13) in a lower part of an inwardly tapered section (12), which forms a duct with a concentric insulation (11). At the lower part of the inwardly tapered section (12) a burner plate (14) is located, as will be described in more detail with reference to FIGS. 4 and 5. Tertiary air is introduced at a level just below burner plate (14) by means of a duct (15a), provided with a control valve (15). Below burner plate (14) is a combustion pipe (20). The tertiary air is introduced through inlet apertures (22).

At the lower end of boiler (3a) is an ashpan (21), and just above the ashpan a lead strip (23) for condensed water. The combined air supply is adjusted in a suitable manner by an extension rod (19), provided with an automatic control valve (15), a switch for minimum level (16), an adjustment screw (17) for the minimum level and an adjustment screw (18) for the tertiary air supply.

Figure 2:
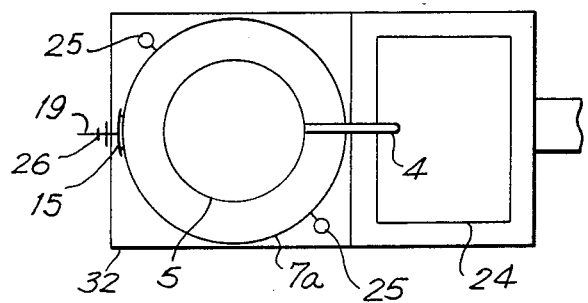
FIG. 2 shows a top view of the heating system of FIG. 1.

In FIG. 2 similar parts are indicated by the same reference numbers as in FIG. 1. For an easy removal of ash, the wood gas generator resting on a fire-box, may be positioned thereon in an easily removable manner, such as by means of lifting means (25). Instead thereof the burner plate 14 may be shaken, for example by means of a suitable lever.

A combined air supply adjustor is presented in FIG. 3, wherein identical reference numbers have been used as in FIG. 1 for similar parts. The supply of air to an inlet for tertiary air (15a) is controlled by a control valve (15), connected by means of pivot point (31), which is connected with outer wall (32), and is adjusted by extension rod (19). The functioning of this arrangement is self-evident and does not require more detailed elucidation.

In order to prevent the gases emanating from the heat generator reaching the heat exchanger in the boiler uncombusted, a certain minimum temperature of the parts of the burner plate and of the active part of the charcoal bed present in the heat generator, when functioning, should be maintained. To this end a flame is maintained in the relatively narrow combustion pipe (20) with complete combustion of the gas, but with a very small capacity. For adjustment of the so-called minimum load a switch (16) for the minimum level is provided, which is controlled by means of a lever (26) by the combined action of pivot-point (30) for lever (26), which is connected with lever (29) and extension rod (19). For proper adjustment of switch (16), an adjustment screw (17) with an appropriate driving spring (27) are provided. For adjustment of supply of tertiary air, control valve (15) is connected with pivot-point (31) by means of lever (29), whereby an adjustment screw (18) on extension rod (19) allows for proper adjustment.

In use for a heating system according to the invention, the generator vessel (7a) is ignited in a customary manner and filled with suitable fuel, usually wood blocks and wood residues, by means of lid (6). After a very short time, usually less then one minute, a charcoal bed is formed in the inwardly tapered section (12), from where wood gas is sucked by ventilator (1) through burner plate (14) into combustion pipe (20). The temperature of the flame emanating therefrom amounts to at least about 800° C. and the system shown above for control of air supply takes care of maintaining a desired combustion. The combustion products, mainly carbon dioxide and aqueous vapor, are passed through the heat exchanger, where the gases and vapor release their heat. The functioning of the heat exchanger is further as customary and does not require further elucidation.

The heating system according to the invention allows one to obtain substantially complete combustion of piece goods, that is small pieces of wood or other cellulosic material, possibly provided with a paint- or plastic-layer, respectively. This system can be used to replace partly or completely customary installations using natural gas, coal or fuel oil as fuel. The heating system according to the present invention avoids the formation of undesired by-products, in particular sulphur-containing compounds, as occurs with coal and fuel oil, whereas with respect to natural gas substantial savings are obtained as waste products of wood processing, saw-dust, dead wood or compressed blocks of saw-dust or wood chippings can be used as a fuel. These fuels for the heating system according to the present invention can be used as such or in combination with other useful components, such as agricultural and horticultural waste materials, regardless of a high or low moisture content.

A suction lid (5) of generator vessel (7a) is positioned above lid (6) in order to prevent gas formed in the generator to cause obnoxious smell in the surrounding space by minor leakage of the lid (6), in particular when at low load. To that end the suction lid (5) is connected with a chimney stack by means of a connection (4), which extends through cleaning hatch (24), thus removing possible leaking gas by means of the ventilator (1). This is desirable for indoor use in particular.

In order to avoid heat losses as much as possible, not only a good insulation is desirable but it is also recommendable to burn the wood gas as close as possible to the charcoal bed using pre-heated air. It is also useful that the air is mixed as well as possible with the gases to be burned. Thus the charcoal bed is boosted with secondary air, increasing the temperature in such a manner, that the ignition temperature of the gases is achieved. For preheating of the air the air is introduced radially through a number of apertures (13) positioned along the periphery of the charcoal bed, after said air has been passed over some distance along the hot wall of the inwardly tapered section (12), in which the charcoal is present.

Hot charcoal bed is resting on a round burner plate (14) of which the annular opening with inwardly tapered section (12) of generator (7a) is large enough to allow fly ash to pass together with the gases, in order to prevent clogging by fly ash.

Mixing can occur thereafter with the tertiary air, which is introduced through numerous small apertures (22) and thus provides optimal combustion.

The gas/air mixture thus formed is then passed into a combustion pipe (20) by means of some eccentrically positioned vertical strips (in the present case 4), wherein the gas mixture is concentrated from the rim of the burner plate (14) towards the center. This is desirable for obtaining an optimal mixture of gas and air, and is necessary to maintain a small flame at minimum load at a temperature which is high enough to avoid pollution of the installation. At a temperature which is too low, soot would be given off by incomplete combustion.

In order to maintain a temperature as high as possible, all parts of the burner, that is burner plate and mixing strips, are positioned as close as possible to the charcoal bed. At the same time the burner should be positioned in such a way that heat dispension by conduction is avoided as much as possible, which can be achieved e.g. by insulation and also a contact surface with other parts of the installation as small as possible.

The gas supply from the generator is not smooth, thus continuous adjustment of the air supply being desirable when fairly coarse piece goods are used. The control of the air supply as described hereinabove is eminently suited for this purpose.

The boiler can be any customary heat exchanger.

As the burner will not function on interruption of the electricity supply to the ventilator (for whatever reason), a safety device for the boiler should be provided if the boiler should be brought back to minimum load within a short time, such as is done in a known manner for customary central heating boilers.

By mounting various types of ventilators, different capacities can be achieved with one and the same size of burner, depending on the application of refractory materials, which is also determined by the ash throughput and the type of piece goods to be burned.

Removal of ash and refilling with suitable fuel in continuous processing are simple actions, which for a properly chosen size of heating installation according to the invention will be required not more than once a day.

The burner plate with mixing strips is further elucidated in FIGS. 4 and 5, wherein similar parts are referred to with the same reference number. Burner plate (14) is positioned over combustion pipe (20) and is kept in this position by mixing strips (33), which rest on the bottom of inwardly tapered section (12), which at the same time take care of centering of the burner plate. Inlet apertures (13) for secondary air are present in the inwardly tapered section (12) above the level of burner plate (14) and inlet apertures (22) for tertiary air are present below the level of the burner plate (14) at the level of the mixing strips (33). Gas present in the charcoal bed (34) in the generator is then mixed with secondary air, flows along the burner plate (14) and past the mixing strips (33) and is mixed there with tertiary air and is subsequently removed whirling through combustion pipe (20). With a view to the high temperatures to which the burner plate and the mixing strips are exposed, it is advisable that these have been made of refractory material. For relatively small installations, such as for home use, foundry iron will usually be sufficient for the burner plate 14. For larger installations, such as those for rising industrial application, higher temperatures have to be taken into account, with as a consequence a preference for ceramic materials, more specifically refractory materials, in order to ascertain a reliable functioning of the installation. It is advisable that the diameter of the combustion pipe (20) is at most half the diameter of the lower end of the inwardly tapered section (12), with the length of the combustion pipe being at least 1.5 times its diameter.

Figure 6:
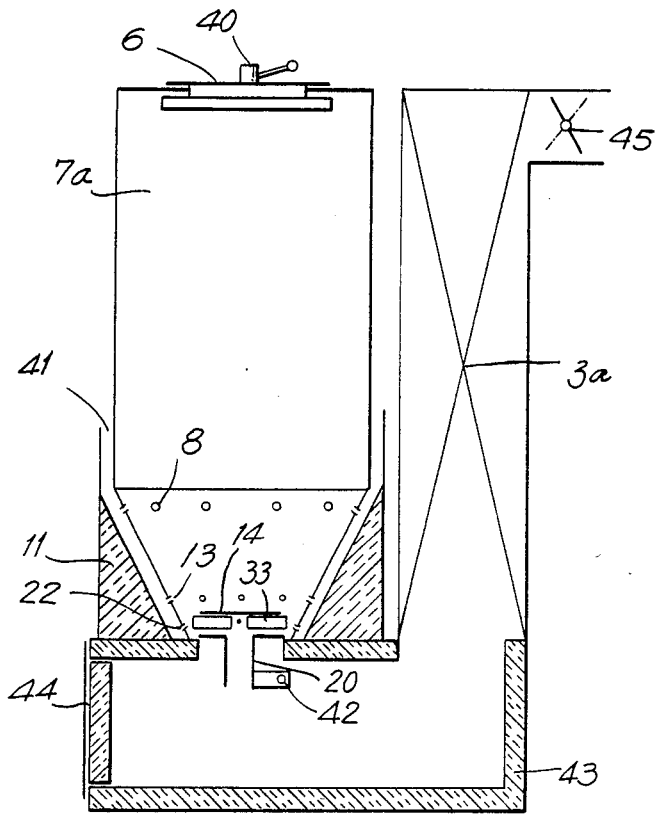
FIG. 6 shows a modification of the heating system as presented in FIG. 1.

FIG. 6 shows a modification of the heating system as presented in FIG. 1, wherein the same reference numbers have been used for similar parts. In addition it comprises a lever (40) for securing the cover (6) on top of generator vessel (7a); a central air inlet (41) provides air for the primary, secondary and tertiary apertures (8), (13) and (22) respectively. The combustion pipe (20) is provided with a lever (42) for shaking the burner plate (14), mixing strips (33) and combustion pipe (20) to remove any ash assembled thereon. A fire-box, whereon the generator vessel (7a) is resting, is formed by refractory bricks (43), said fire-box also having a door (44) for easy removal of ashes. In the exhaust pipe is an adjustable servo valve (45).

Figure 7:
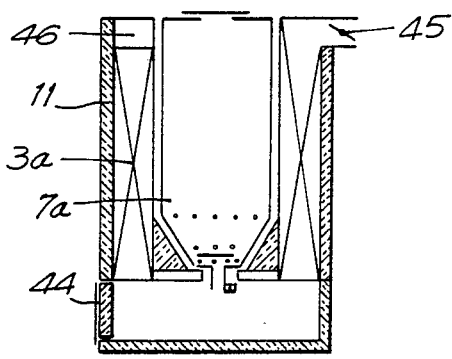
FIG. 7 shows another modification of the heating system as presented in FIG. 1.
Figure 8:
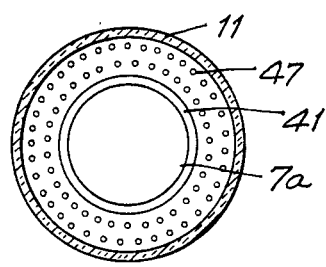
FIG. 8 shows a horizontal cross-section of the heating system of FIG. 7.

FIGS. 7 and 8 show a longitudinal section and a horizontal cross-section respectively of another modification of the heating system as presented in FIG. 1, using the same reference numbers for similar parts as used in FIGS. 1 and 6. In addition a flue gas duct (46) is shown in FIG. 7 and in FIG. 8 fire-tubes (47) are present as heat exchangers.

As will be evident from FIG. 6, it is possible to provide a suitably adjustable generator vessel without any more or less complicated controls for the various air flows, the capacity and load being largely dictated by the ventilator (1) (not shown in FIG. 6).

The modification as shown in FIGS. 7 and 8 has the advantage of a minimum heat loss, as both heat generator and heat exchanger are confined within one and the same insulating wall.

If desired the novel heat generator can be used for destruction of wood as a consequence of the burner and combustion pipe present thereon, without the disadvantages with respect to pollution of the environment, as occurs by burning wood on grids causing smoke and tar formation.

In particular from the viewpoint of environmental hygiene, it is considered to be of major importance that the heating system and the heat generator according to the invention does not only expel hardly any harmful components, if any, but in essence only carbon dioxide, but also provide a solution for the fly ash problem. Thus no dust filters are required and the stack of chimney needs cleaning considerably less frequently than most conventional systems, with the possible exception of natural gas.

It will be obvious to persons skilled in the art that the invention encompasses other advantages and modifications than those described above.

What I claim is:

1. A heat generator, comprising: a fuel supply chamber having an upper fuel supply section provided with a feed port with a lid, said chamber having at its lower end an inwardly tapered section and including at said tapered section lower end a burner plate with mixing strips and a combustion pipe with collar, in which a continuous gas flow can be maintained from the tapered section and concentrating into the combustion pipe, said inwardly tapered section being provided with a supply line emerging in the tapered section upper part for primary air, a supply line emerging in the tapered section lower part at a level just above the level of the burner plate for secondary air, and a supply line emerging in the tapered section lower part at a level just below the level of the burner plate and at the level of the mixing strips for tertiary air, whereby a continuous gas flow is provided from said combustion pipe towards a gas discharge pipe connected therewith.

2. A heat generator according to claim 1, wherein said burner plate is provided with multiple eccentrically positioned mixing strips between the burner plate and said combustion pipe.

3. A heat generator according to claim 1, wherein a supply line emerging in a plurality of holes in the upper part of the wall of the inwardly tapered section is provided for supplying the primary air.

4. A heat generator according to claim 1, wherein at least one air-lance is provided for releasing the primary air within the inwardly tapered section at the level of the upper part thereof.

5. A heat generator according to claim 1, wherein a supply line emerging in a plurality of holes at the lower end of the inwardly tapered section at a level just above the level of the burner plate, is provided for supplying the secondary air.

6. A heat generator according to claim 5, wherein the secondary air is preheated before entering said supply line.

7. A heat generator according to claim 1, wherein a supply line emerging in a plurality of holes in the lower end of the wall of the inwardly tapered section at a level just below the burner is provided for supplying the teritary air, the tertiary air being preheated.

8. A heat generator according to claim 1, comprising a fuel supply vessel, provided with an insulating wall, a feed port with a lid, and provided at the lower end with an inwardly tapered section having multiple inlet holes for the supply of the primary air, multiple inlet holes for supplying the secondary air, said inwardly tapered section forming a duct in cooperation with a concentric insulation, said inwardly tapered section having in its lower end a burner plate with mixing strips and a subsequent combustion pipe, said combustion pipe being in closed connection with an outlet pipe for gas discharge.

9. A heat generator according to claim 8, wherein the outlet pipe is provided with a ventilator for removal of combustion gases.

10. A heat generator according to claim 1, wherein a heat exchanger is flow connected with said heat generator and are confined within a common insulating wall.

11. A heat generator, comprising (a) a fuel supply chamber having an upper fuel supply section provided with a feed port with a lid, said chamber having at the lower end an inwardly tapered section; (b) a burner plate located at said inwardly tapered section lower end, said burner plate having eccentrically positioned mixing strips located between the burner plate and a combustion pipe with collar, in which a continuous gas flow can be maintained from the tapered section and concentrating into the combustion pipe, said inwardly tapered section being provided with a supply line emerging in its upper part for primary air, a supply line emerging in its lower part at a level just above the level of the burner plate for secondary air, and a supply line emerging in the tapered section lower part at a level just below the level of the burner plate and at the level of the mixing strips for tertiary air; and (c) a heat exchanger connected with said inwardly tapered section, whereby a continuous gas flow is provided towards a gas discharge pipe connected therewith.

12. A heat generator, comprising:
(a) a fuel supply chamber having an upper fuel supply section provided with a feed port with a lid, said chamber having at the lower end an inwardly tapered section;
(b) a burner plate and a combustion pipe with collar located at the lower end of said inwardly tapered section, said burner plate being supported by eccentrically positioned mixing strips located between the plate and a combustion pipe collar, wherein a continuous gas flow can be maintained from the tapered section and concentrating into the combustion pipe, said inwardly tapered section being provided with a supply line emerging in a plurality of holes in its upper part for primary air, a supply line emerging in a plurality of holes in its lower part at a level just above the level of the burner plate for secondary air, and a supply line emerging in the tapered section lower part at a level just below the level of the burner plate and at the level of the mixing strips for tertiary air; and
(c) a heat exchanger connected with said inwardly tapered section, and confined within a common insulating wall, whereby a continuous gas flow is provided from said combustion pipe towards a gas discharge pipe connected therewith.

* * * * *